June 18, 1963  W. DEICHMANN  3,094,319
TURNTABLE CUTTING MACHINES
Filed Nov. 26, 1958  8 Sheets-Sheet 1
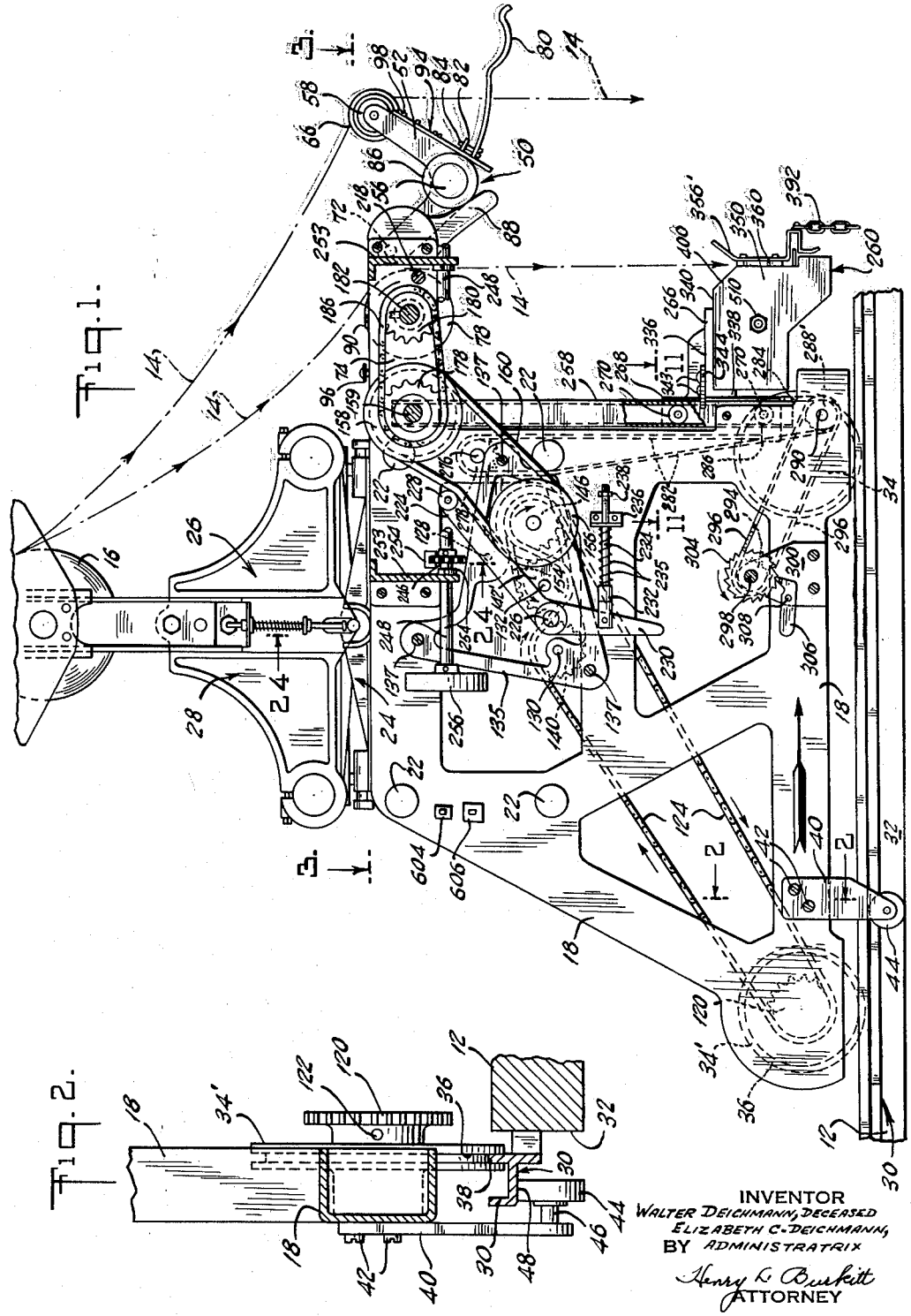
INVENTOR
WALTER DEICHMANN, DECEASED
ELIZABETH C. DEICHMANN,
BY ADMINISTRATRIX
Henry L. Burkitt
ATTORNEY

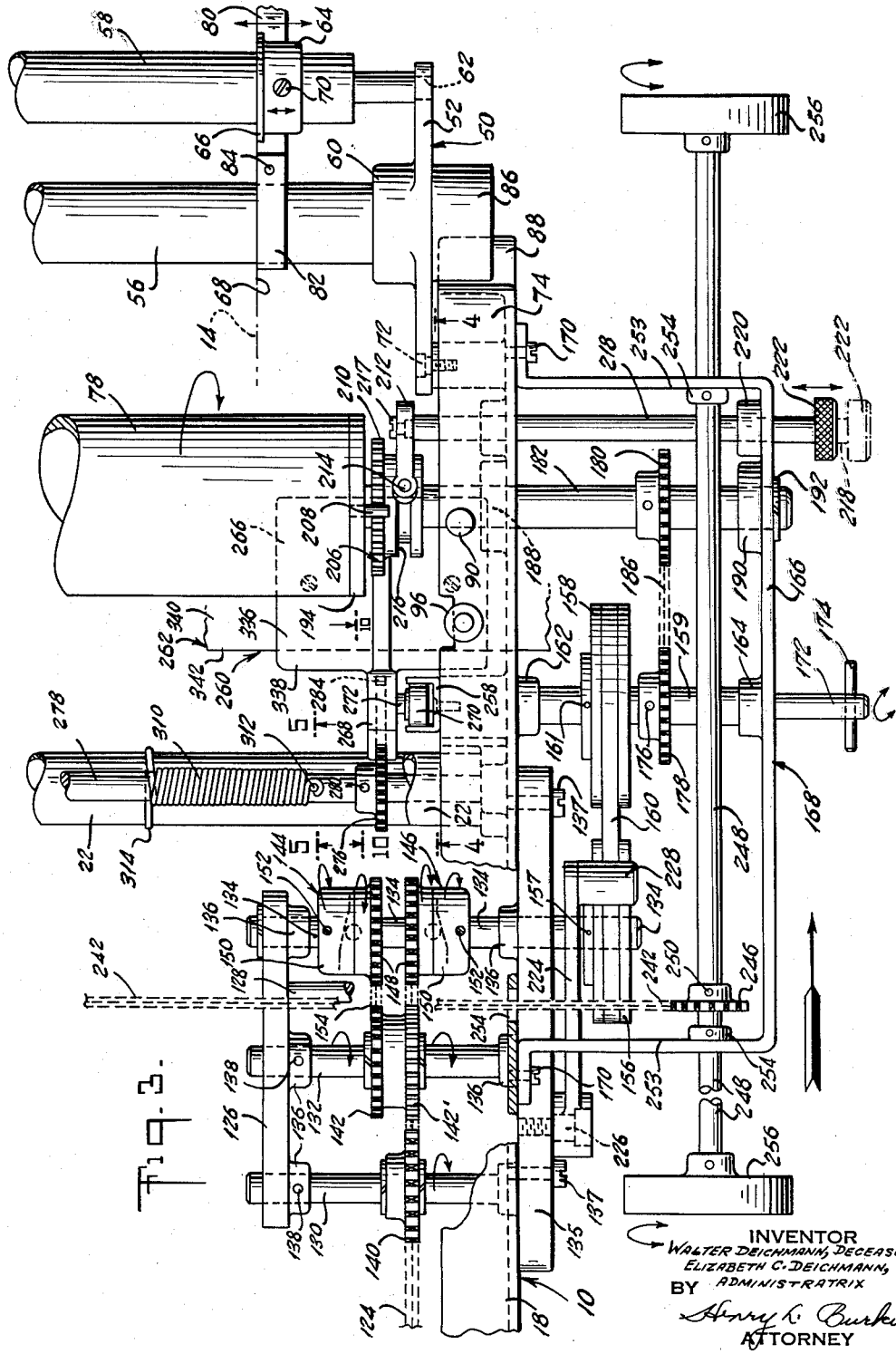

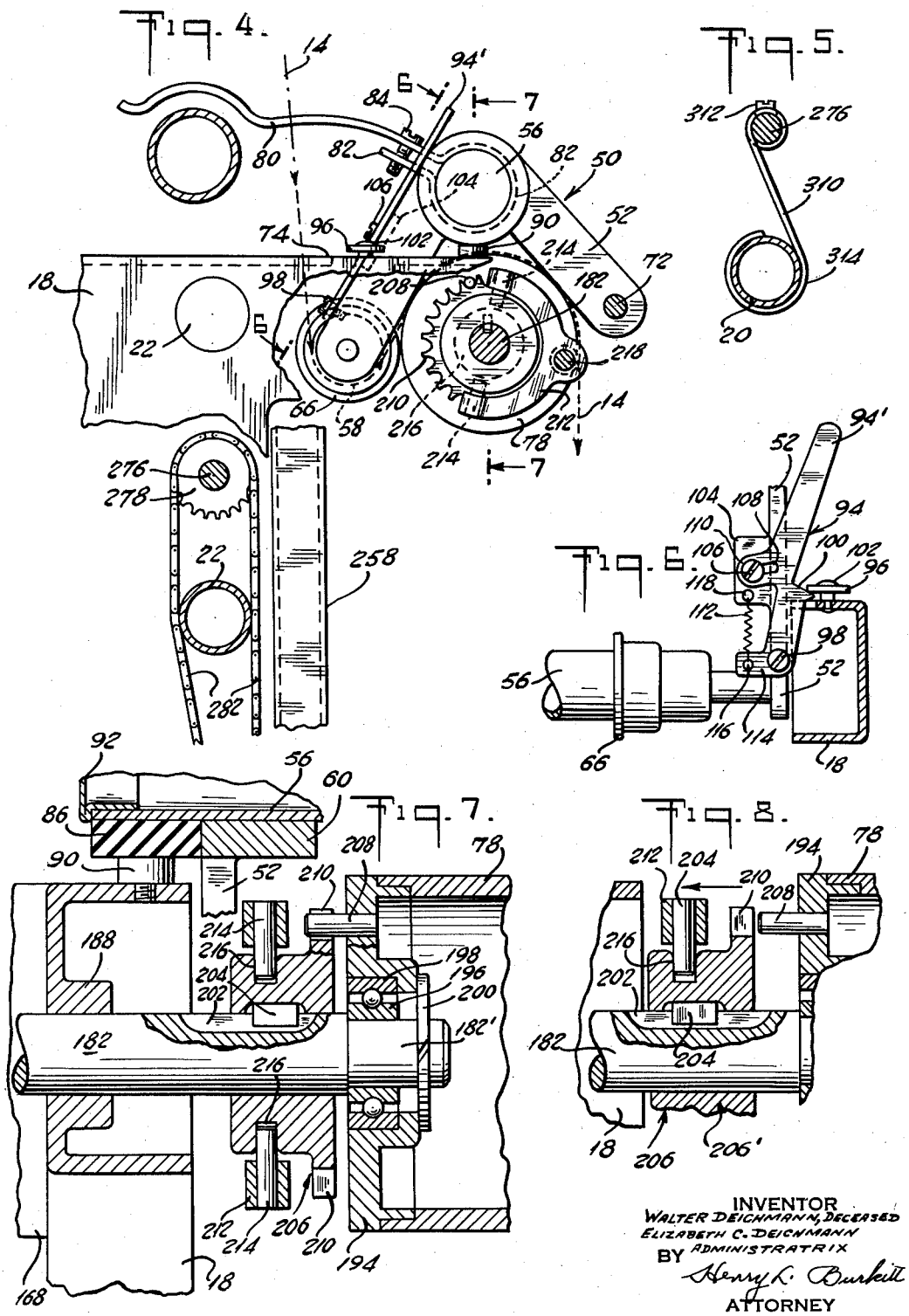

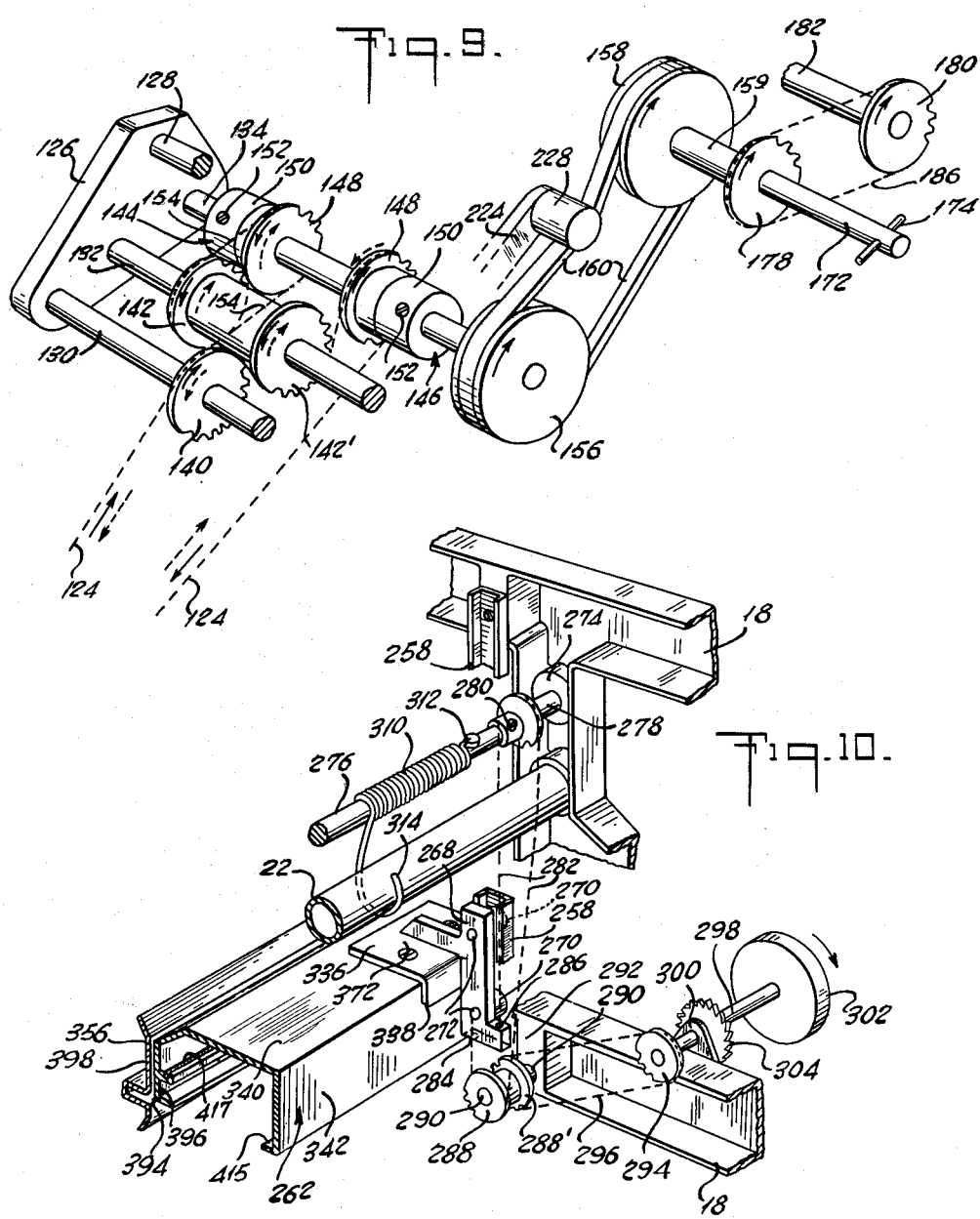

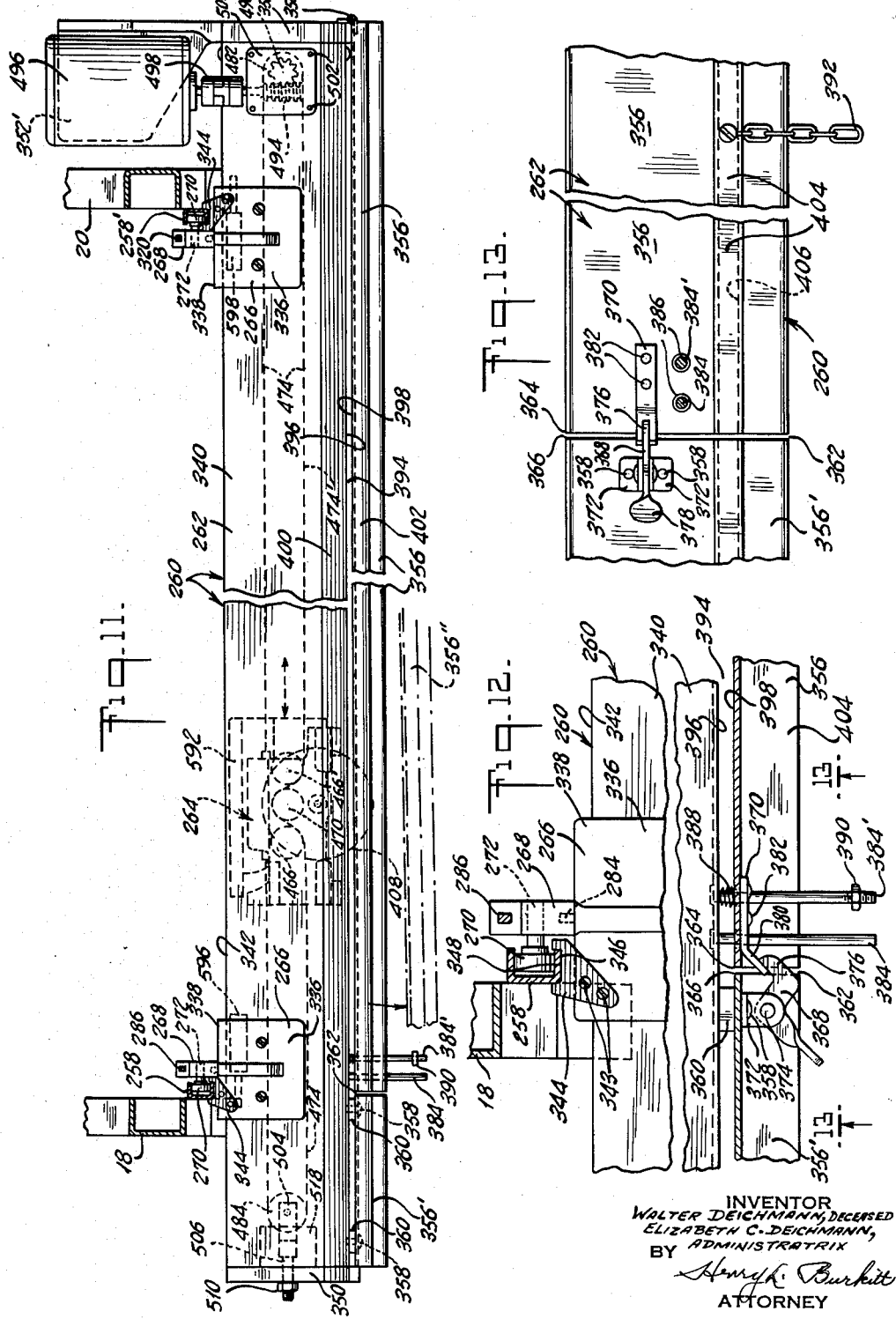

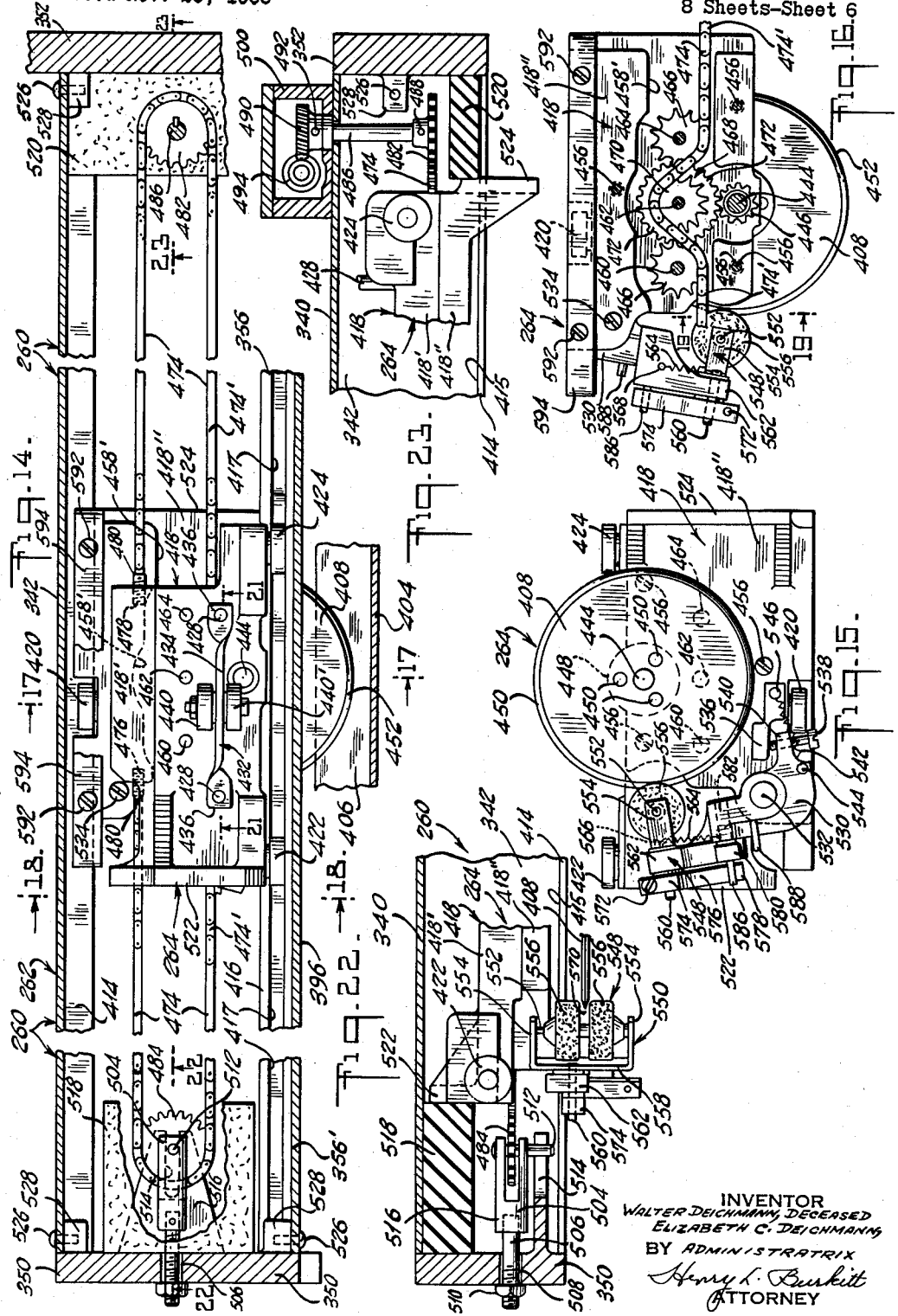

June 18, 1963 W. DEICHMANN 3,094,319
TURNTABLE CUTTING MACHINES
Filed Nov. 26, 1958 8 Sheets-Sheet 7
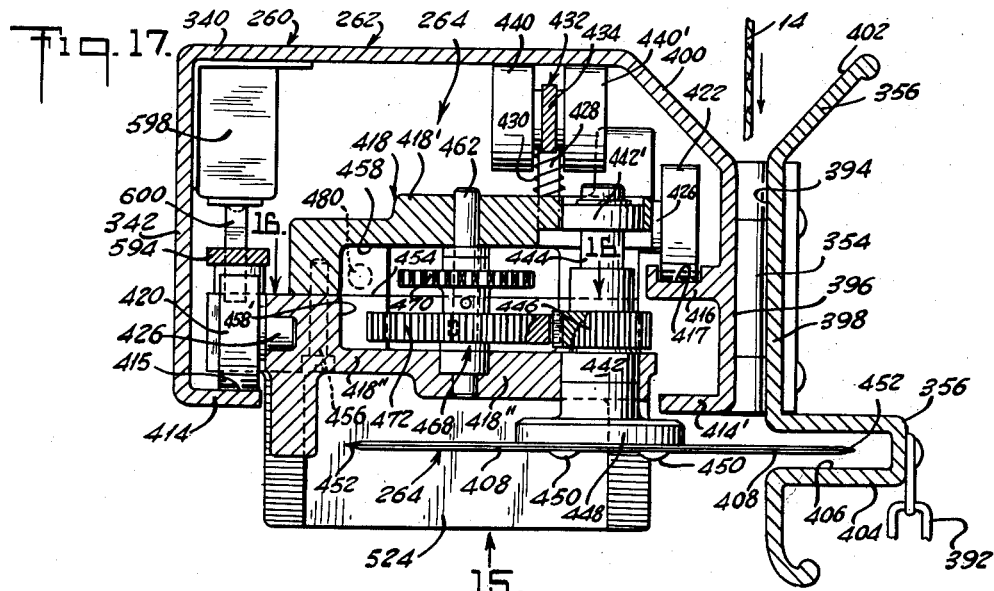
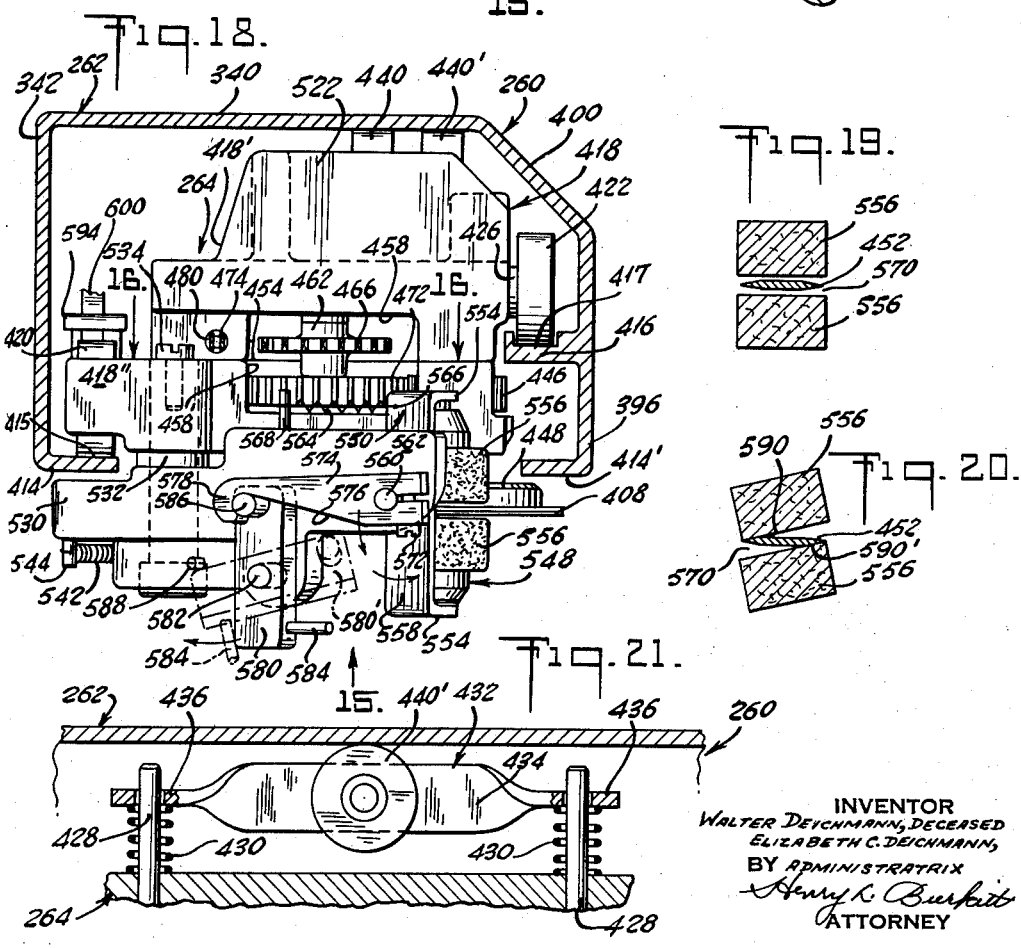
INVENTOR
WALTER DEICHMANN, DECEASED
ELIZABETH C. DEICHMANN,
BY ADMINISTRATRIX
ATTORNEY

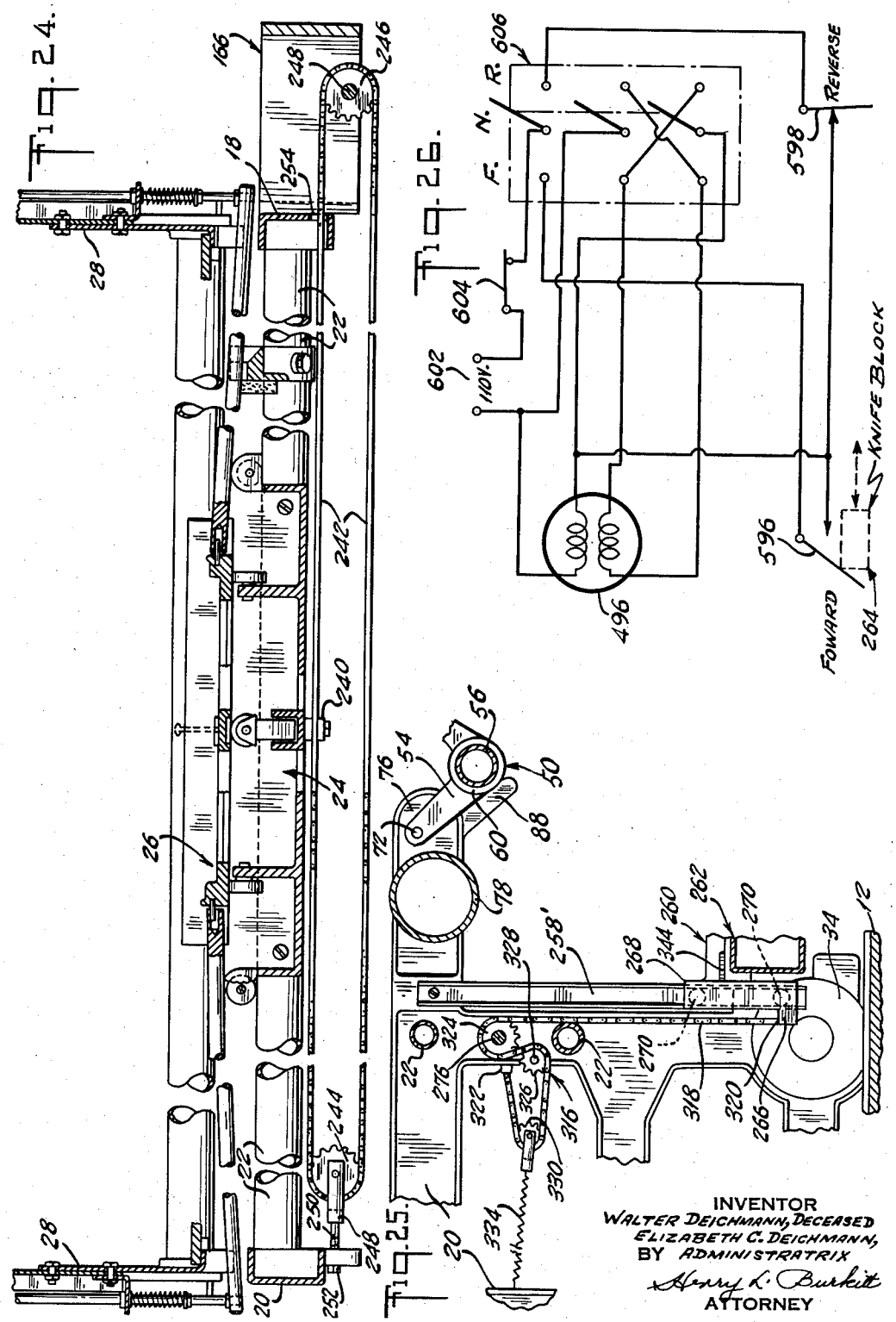

United States Patent Office 3,094,319
Patented June 18, 1963

3,094,319
TURNTABLE CUTTING MACHINES
Walter Deichmann, deceased, late of Mineola, N.Y., by Elizabeth C. Deichmann, administratrix, Mineola, N.Y., assignor to Cutting Room Appliances Corp., New York, N.Y., a corporation of New York
Filed Nov. 26, 1958, Ser. No. 776,645
14 Claims. (Cl. 270—31)

This invention relates generally to spreading machines of the turntable type having cutting apparatus.

In application, Serial No. 647,407, filed March 20, 1957, entitled Turntable Spreading Machines, now U.S. Patent No. 2,980,421, there is disclosed a turntable spreading machine in which a swiveling carrier for the sheet material is provided so that after a spread layer is cut such carrier may be swiveled to bring the next layer into the desired relationship with the previously produced layers. The invention relates to an improved spreading machine of this general character having such "turntable," in which novel features and improvements are provided including cutting apparatus for severing each layer subsequent to the spreading thereof.

It is an object of the invention to provide, in a turntable spreading machine, means for facile lateral adjustment of the carrier upon which the fabric to be spread is supported wherein the parts are disposed in a simplified arrangement, and capable of manipulation from either side as the operator or operators propel the machine along a table.

It is an object of the invention to provide, in a spreading machine of the turntable type, means for producing what is sometimes characterized as "tensionless feeding," in that fabric will be delivered to the table by a continuously fed strip which is, at point of delivery to the table, substantially without drag or pull which might distort the fabric, particularly where patterns woven into or printed upon the fabric are in some measure determined by the pull of the threads.

One important object of the invention is the provision, in a spreading machine, of an improved arrangement for threading the sheet material through the machine, and feeding the same to the table in a properly guided manner. There may be provided a drive roll for feeding the sheet material having improved provision for achieving wraparound of the sheet material with respect to the drive roll, and with means for facilitating the threading operation. There may also be provision of means for releasably latching the wrap-around means in desired operative relation with respect to the drive roll.

Another object of the invention is the provision, in a spreading machine, of a reciprocable cutter adapted for rotation concomitant with the reciprocation thereof, there being improved simple and positive operating mechanism provided to impart concomitant reciprocation and high speed rotation to the sheet material or cloth cutting disc.

A single stroke of travel of the cutter assembly in either direction along the length of the cutter provides a fabric cutting operation. Another object of the invention is the provision of improved means for reversing the path of travel of the cutter assembly at the terminus of each cutting stroke.

A feature of such cutter assembly is the provision of selective means for dressing or buffering the cloth cutting disc during the operation thereof.

One of the major problems associated with the provision of automatic cutting apparatus in a spreading machine relates to the mounting or suspension of the cutter assembly for reciprocation. As the load constituted by the cutter assembly travels along its support, there is introduced the problem of flexure of the support as such assembly travels therealong, and attendant improper results in the cutting action. Another object of the invention is the provision of an improved suspension arrangement for the cutter assembly in which the aforenoted problem is obviated and in which the support is rigidified against distortion consistent with lightness of weight, simplicity of constructon and ease of fabrcation.

Other objects of the invention will be set forth hereinafter, or will be apparent from the description and the drawings, in which embodiments are illustrated to exemplify the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of operative embodiments, but not to show all the various forms of modifications in which the invention might be embodied.

On the drawings, in which the same reference characters refer to the same parts throughout and in which is disclosed such practical construction:

FIG. 1 is a side elevational view showing a spreading machine according to the invention mounted upon a table, with the swingable frame constituting a drive roll wraparound provision shown in an open threading position, said view looking from the operating side of the machine;

FIG. 2 is a sectional view, on an enlarged scale, taken on the line 2—2 of FIG. 1;

FIG. 3 is a sectional view, on an enlarged scale, taken on the line 3—3 of FIG. 1 with part broken away to reveal structural details;

FIG. 4 is a sectional view taken on the line 4—4 of FIG. 3, with the swingable frame shown in a latched closed operating position;

FIG. 5 is a sectional view taken on the line 5—5 of FIG. 3, showing a detail of the cutter box counter balance;

FIG. 6 is a sectional view taken on the line 6—6 of FIG. 4, showing the swingable frame latch mechanism;

FIG. 7 is a sectional view on an enlarged scale taken on the line 7—7 of FIG. 4 with the drive roll drivingly engaged;

FIG. 8 is a view showing a fragmentary portion of FIG. 7 with the drive roll drivingly disengaged;

FIG. 9 is a diagrammatic perspective view of the drive mechanism train for the drive roll, the solid line arrows of the pairs of arrows indicating one direction of carriage movement and the broken line arrows of said pairs indicating the opposite direction of carriage movement;

FIG. 10 is a perspective view showing the mechanism for elevating the cutter box at one side thereof, said view being taken on the line 10—10 of FIG. 3;

FIG. 11 is a top plan view of the cutter box, said view being taken on the line 11—11 of FIG. 1;

FIG. 12 is an enlarged fragmentary view of the left-hand end region of FIG. 11;

FIG. 13 is a fragmentary front elevational view of the cutter box in the region of the door latch, taken on the line 13—13 of FIG. 12;

FIG. 14 is an enlarged fragmentary horizontal sectional view of the cutter box, the latter being shown in plan;

FIG. 15 is a bottom plan view of the cutter assembly looking in the direction of arrow 15 of FIGS. 17 and 18;

FIG. 16 is a plan view of the cutter assembly, taken on the line 16—16 of FIGS. 17 and 18;

FIG. 17 is a transverse sectional view through the cutter box and cutter assembly, taken on the line 17—17 of FIG. 14;

FIG. 18 is a side elevational view of the cutter assembly, taken on the line 18—18 of FIG. 14;

FIG. 19 is an enlarged fragmentary sectional view showing the buffering wheels in association with the cutting disc with said wheels being in non-operating position, said view being taken on the line 19—19 of FIG. 16;

FIG. 20 is a view similar to FIG. 19 showing the buffering wheels in operative association with the cutting disc;

FIG. 21 is an enlarged sectional view of a portion of the cutter assembly, taken on the line 21—21 of FIG. 14;

FIG. 22 is a sectional view taken on the line 22—22 of FIG. 14;

FIG. 23 is a sectional view taken on the line 23—23 of FIG. 14;

FIG. 24 is a vertical cross-sectional view taken on the line 24—24 of FIG. 1;

FIG. 25 is a view companion to FIG. 10 showing a fragmentary side elevational view of the cutter box elevating mechanism at the side opposite to that shown in FIG. 10; and FIG. 26 is a wiring diagram of the cutter assembly motor and control circuit.

Referring to the drawings, and more particularly to FIGS. 1 to 4 thereof, there is shown a spreading machine 10 mounted to move along a table 12 to spread layers of sheet material 14, such as fabric from a roll 16 of such material. The machine 10 comprises a pair of laterally spaced end frames 18 and 20 which are rigidly interconnected in this spaced relation by the tubular cross members 22 to define the carriage of the machine. Riding on the upper pair of members 22 is a carrier 24 upon which is pivoted a spreader 26, the latter having mounted thereon the cloth carrying means 28 for supporting roll 16. The carrier 24 and structure superposed thereon and carried thereby is similar to the corresponding structure of the aforereferred to application, Serial No. 647,407, and reference is made to said application for a detailed description of such structure, the carrier 24 of the present invention differing from the carrier of said application in the respects to be pointed out hereinafter.

In order to properly guide machine 10 for movement longitudinally of the table, tracks 30 are secured to the opposite edges 32 of the table. Upon these tracks roll wheels 34 suitably mounted for rotation with respect to the frames 18 and 20, each wheel being provided with a groove 36 which interfits with the flange 38 of the track to thereby guide the machine in its travel over the table. If desired, the machine may be positively guided in this manner at frame side 18 only with the other side being provided with treaded wheels which roll directly upon the top face of the table. In order to prevent the machine from tipping under load or stress during its operation, each frame is provided with a retaining bracket 40 (FIGS. 1 and 2) secured thereto by bolts 42, the bracket having a stub shaft 46 carrying a roller 44 which engages the underside 48 of the track to thereby prevent vertical displacement of the machine with respect to the table.

In order to properly guide and feed the fabric to the table, there is provided a swingable frame 50 comprising an opposite pair of L-shaped end frames 52 and 54 (FIGS 1, 3, 4, and 25) which mount a tubular tie rod 56 and roll 58. The tie rod 56 is suitably secured at its opposite ends in sockets 60 of frames 52, 54 and roll 58 is provided with end shaft portion 62 which are suitably journalled for rotation in said frames. Roll 58 has adjustably mounted thereon a pair of edge guides 64 for guiding the opposite edges 68 of the traveling fabric, each guide being of sleeve type construction with a peripheral inner flange 66 which is adjusted to guide a companion side edge 68 of the fabric. The guides 64 are adjustable along the length of roll 58 and are releasably retained in adjusted position by set screws 70. The frame 50 is mounted for swingable movement about a pivot axis constituted by the stub shafts 72 which are suitably mounted in the frame extensions 74 and 76. The frame is pivotally movable between the open or fabric threading position shown in FIGS. 1 and 3, and the closed operating or feeding position shown in FIG. 4, the frame in the latter position achieving the desired wrap-around of the fabric with respect to the feed roll 78 which is positively driven on movement of the machine along the table as will be described in detail hereinafter. Mounted on the tie rod 56 is a side edge guide 80 for the fabric, said guide having a mounting part 82 which encircles the tie rod and which is releasably clamped thereto by bolt 84. The guide 80 is adjustable longitudinally of the tie rod by loosening bolt 84 and shifting the guide to a selected position and clamping the same thereat. It will be noted that the guide extends in substantially a horizontal position in the fabric threading position of the swingable frame. The tie rod 56 is provided with a sleeve 86 (FIGS. 1 and 7) of rubber or other suitable shock absorbent material which engages a companion bumper 88 of frame extension 74 to limit the swinging movement of frame 50 in an opening or threading direction. The sleeve 86 engages bumper 90 at the top of extension 74 in the closed operating position of the frame 50. The tie rod 56 is of hollow construction and the open ends thereof are closed by end caps 92.

The frame 50 is releasably latched in the closed operating position by the complementary pair of releasably interengageable latch parts 94 and 96 (FIG. 6). The latch part 94 is constituted by a lever suitably pivotally mounted at 98 on frame 52, the lever having a cam shaped latch portion 100 disposed to interlock with latch part 96 which is constituted by an annular member or washer secured to the frame extension 74 in spaced relation therewith by fastener 102. The frame 52 is provided with an extension 104 having a screw 106 threaded therein, the latter extending through the elongated slot 108 provided in the extension 110 of the lever. The screw 106 cooperates with slot 108 to limit the extremes of pivotal movement of the lever. The latter is biased in a latching direction by spring 112 having one end fixed to extension 114 at the bottom end of the lever as indicated at 116 with the opposite end fixed to extension 104 at 118. The lever includes a handle part 94' which may be used to swing the frame 50 between extreme positions, the lever automatically latching with latch part 96 on the movement of frame 50 to its operating position by virtue of cam shaped latch portion 100 which snaps under part 96. The frame may be readily released from latching engagement by pivoting lever 94 away from latch part 96 against the action of spring 112.

As aforenoted, on the movement of the machine along the table the feed roll 78 is positively driven, the direction of rotation of the feed roll being the same independent of the direction of movement of the machine along the table. One wheel 34' (FIG. 2) has a sprocket 120 keyed thereto as indicated at 122 for rotation therewith, said sprocket driving chain 124. Laterally spaced from frame 18 is a mounting plate 126 which is rigidly interconnected with said frame by the stationary shafts 128, 130, and 132, there also being a rotatable shaft 134 extending between said frame and mounting plate (FIGS. 1, 3 and 9). A mounting plate 135 is secured to the outer side of frame 18 by means of bolts 137. The shafts 130, 132 and 134 are mounted in sockets 136 provided in plates 126 and 135, the shaft 134 being journalled for rotation in its companion sockets and shafts 130 and 132 being pinned at socket 136 of plate 126 as indicated at 138. Rotatably mounted on shaft 130 is a sprocket 140 and rotatably mounted on shaft 132 is a dual sprocket 142, 142', integrally interconnected. The shaft 134 mounts a pair of clutches 144 and 146 one of which is in driving engagement while the other idles depending on the direction of movement of chain 124. The clutches may be of any suitable type such as a ball clutch, or the like, each clutch comprising a sprocket 148 and a companion driving part 150 pinned to shaft 134 at 152.

On the movement of the machine in a left to right direction viewing FIG. 1 the solid line arrows of the pairs of arrows indicate the direction of movement of the sprockets 140, 142, 142′, 148 and chain 124 with the broken line arrows of said pairs indicating the opposite direction of movement. Chain 124 engages over sprocket 140, under sprocket 142′, over sprocket 148 of clutch 146 and returns to sprocket 120, said chain being of endless construction. Endless chain 154 operatively interconnects sprocket 142 and sprocket 148 of clutch 144. Thus on left to right movement of the machine viewing FIG. 1, dual sprocket 142, 142′ will rotate counterclockwise and clutch sprocket 148 of clutch 144 will also rotate in a counterclockwise direction whereby said clutch will idle and will be drivingly disengaged from clutch part 150 and shaft 134. The sprocket 148 of clutch 146 will rotate clockwise and will be in driving engagement with part 150 of said clutch to thereby drive shaft 134 in a clockwise direction. On right to left movement of the machine viewing FIG. 1, dual sprocket 142, 142′ will rotate clockwise and clutch sprocket 148 of clutch 144 will also rotate in said direction and will be in driving engagement with part 150 of said clutch to thereby drive shaft 134 in a clockwise direction. A sprocket 148 of clutch 146 will rotate counterclockwise and will be idle and be drivingly disengaged from clutch part 150 of said clutch and shaft 134. Thus shaft 134 will be driven in a clockwise direction by wheel 34′ irrespective of the direction of rotation of the latter.

Shaft 134 projects laterally beyond frame 18 and plate 135 and mounted on said shaft outboard of said plate is a pulley 156, the latter being pinned to said shaft as indicated at 157. The pulley 156 is in driving engagement with pulley 158 by means of belt 160, the pulley 158 being of the adjustable split type. The pulley 158 is suitably keyed to its mounting shaft 159 as indicated at 161, said shaft being journaled for rotation in socket 162 of frame 18 and socket 164 of the base plate 166 of the U-shaped bracket 168 which is bolted to frame 18 as indicated at 170. The effectual diameter and consequently the speed of rotation of shaft 159 is controlled by the manually adjustable shaft 172 which extends beyond bracket 168, said shaft having a cross pin 174 to facilitate the manual rotation of shaft 172 and the speed adjustment of shaft 159. Pinned to shaft 159 at 176 is a sprocket 178 which is in driving engagement with sprocket 180, pinned to shaft 182 as indicated at 184, by chain 186. The shaft 182 is selectively engageable with the feed roll 78 to drive the same. The shaft 182 is journalled for rotation in the bearing portion 188 of frame 18 and socket 190 of plate 166, the shaft 182 having a retainer ring 192 thereon at the outer side of said plate.

With reference to FIGS. 4, 7 and 8, the feed roll 78 is of hollow construction having end closure plates 194 only one of which is shown on the drawings. The closure plate 194 shown is journalled for rotation on shaft 182 by means of ballbearing 196 seated on shaft part 182′, said plate being in interfitting relation with said bearing as indicated at 198. The assembly is retained in position by means of retainer ring 200 engaged on shaft part 182′ against the inner side of plate 194. Shaft 182 is provided with a longitudinal keyway 202 for the reception of a complementary key 204 which keys together the shaft 182 and the shiftable sprocket 206. The end plate 194 is provided with a projecting drive pin 208 which interengages in any one of the teeth 210 of the sprocket 206 to provide driving engagement between shaft 182 and the feed roll as shown in FIG. 7, said sprocket being shift-able away from plate 194 as indicated at 206′ to disengage pin 208 from the sprocket and release the feed roll for free wheeling as shown in FIG. 8. The shifting of the sprocket with respect to the feed roll is controlled by the C-shaped yoke 212 having diametrically opposed pins 214 which ride freely in peripheral groove 216 of sprocket 206. Secured to yoke 212 at 217 and extending laterally from said yoke is a control shaft 218, which extends to the outer side of plate 166 through socket 220 thereof, said shaft having a knurled knob 222 suitably affixed to the outer end thereof. In the solid line position of said knob, as shown in FIG. 3, the feed roll will be in driving engagement with shaft 182 and on manipulating said knob to the broken line "out" position the yoke 212 will be removed to concomitantly shift sprocket 206 to disengage the same from pin 208 and thereby disconnect the feed roll from driving engagement with the shaft 182. The feed roll will normally be in driving engagement with the shaft 182 and will thus be positively driven on the movement of the machine along the table, except during the threading operation when the feed roll will be disengaged from said shaft.

A tension device is provided to apply proper tension to belt 160 said device comprising an arm 224 pivotally mounted to plate 135 as indicated at 226, said arm having a laterally projecting part 228 which engages the upper run of belt 160. The arm 224 has a depending part 230 pivotally carrying a bracket 232 having a rod 234 extending through the bracket 236 suitably fixed to frame 18, there being a spring 235 on rod 234 coacting between brackets 232 and 236 to bias arm 224 in a clockwise direction about its pivot axis viewing FIG. 1 to thereby apply the bracing force of said spring against the belt 160. The rod 234 has a nut 238 threaded thereon outwardly of bracket 236.

With reference to FIG. 24, the carrier 24 has a depending bracket 240 which is suitably clamped to the upper run of chain 242 which is trained around sprockets 244 and 246, the sprocket 244 being carried in a forked member 248 mounted on threaded pin 250 extending through an opening of frame 20 and anchored by nut 252. The upper run of chain 242 passes through an opening 254 provided therefor in frame 18. The sprocket 246 is keyed to shaft 248 as indicated at 250, said shaft extending through openings provided therefor in the spaced arms 253 of bracket 168. Suitable stop collars 254 are mounted on shaft 248 at the inner sides of arms 252 to fix the position of said shaft. Fixedly mounted on the outer ends of shaft 248 are wheels 256 provided for manual rotation of said shaft in the desired direction, it being apparent that the rotation of said shaft provides for adjustment of the carrier 24 lengthwise along the guides constituted by members 22 to adjust the position of the longitudinal side edge of the traveling fabric fed to the table. It will be observed that the drive train for the lengthwise adjustment of the carrier is disposed therebelow.

Suitably bolted or otherwise secured to frames 18 and 20 are a pair of vertically disposed and transversely aligned U-shaped channel members 258, 258′ which define tracks for the vertical movement of the cloth cutting device generally designated by the numeral 260. The cutting device 260 comprises a horizontally disposed longitudinally extending cutter box 262 which mounts the cutter assembly 264 for reciprocation in a horizontal plane and transversely of the table. Suitably affixed to each end of cutter box 262 is a generally L-shaped mounting bracket 266 having an upright post 268 mounting a pair of vertically spaced rollers 270 which ride in a companion channel member 258, 258′. The rollers 270 are mounted for rotation on companion stub shafts 272. The manner of raising and lowering the cutter box will now be described. Journalled for rotation in sockets 274 provided in the end frames is a shaft 276 having a sprocket 278 keyed thereto as indicated at 280 (see FIG. 10), there being a chain 282 trained thereover with the end of the chain anchored to post 268 at anchor points 284 and 286. The chain 282 at the bottom is trained over sprocket 288 of dual sprocket 288, 288', the dual sprocket being mounted for rotation on stub shaft 290 carried by the rib part 292 of frame 18. Trained over sprockets 288' and 294 is a chain 296, the sprocket 294 being fixed to shaft 298 which is rotatably carried in bracket 300 mounted to the frame 18. A hand wheel 302 is fixed to the outer end of shaft 298 to facilitate the rotation of said shaft and achieve the desired vertical adjustment of the cutter box. A ratchet wheel 304 is suitably secured to shaft 298 for coaction with the pawl 306 pivoted on bracket 300 as indicated at 308 (FIG. 1). The hand wheel 302 is rotated in the direction of the arrows shown in FIGS. 1 and 10 to raise the cutter box and on such raising the pawl will ratchet over the ratchet wheel and clutch the latter in position at the desired adjusted level of the cutter box. The pawl may be facilely released from the ratchet wheel to permit the cutter box to be lowered. From the above it will be apparent that the rotation of the hand wheel 302 will be effective to correspondingly drive chains 296 and 282 and thereby adjust the level of the cutter box interposed as linkage of chain 282. The gravity of the cutter box and devices carried thereby is counterbalanced by the spring 310 fitted over shaft 276 (FIGS. 5 and 10), one end of said spring being anchored to said shaft as indicated at 312 with the opposite looped end 314 of said spring engaged over member 22. On lowering and raising the cutter box the counterbalance spring winds and unwinds, respectively, whereby the cutter box may be effortlessly raised and lowered.

At the opposite side of the cutter box take-up mechanism 316 is provided comprising a chain 318 anchored at one end at point 320 of its companion bracket 266 with the opposite end of the chain being anchored to the frame 20 at anchor point 322. The chain 318 is trained over sprocket 324 keyed to the shaft 276, idler sprocket 326 carried by stub shaft 328 mounted in the frame 20, and sprocket 330 carried by the forked fitting 332 connected to the frame through the intermediation of spring 334. Proper tension is thus applied to the chain 318 by the spring actuated sprocket 330. In this instant embodiment the mounting brackets 266 are of cast metallic construction and include mounting flange parts 336 and 338 which interfit with the walls 340 and 342, respectively, of the cutter box.

Mounted on one side of the flange part 336 of each bracket 266 by fasteners 343 is a guide plate 344 having a longitudinal cutout 346 to receive an adjacent leg 348 of a companion track member 258 with slight clearance, the plates 344 thereby riding along members 258 and guiding the vertical movement of the cutter box with the rollers 270 properly oriented for movement along members 258 (FIGS. 11 and 12). The cutter box 262 is provided with end plates 350 and 352 and hingedly mounted on end plate 352 by means of hinge 354 is cutter box door 356. The hingedly mounted door extends the major portion of the length of the cutter box and a fixed section 356' defines a continuation of the door, being aligned therewith, and extends along the remaining length of the cutter box. The door section 356' is secured to the cutter box by festeners 358, there being spacers 360 positioned on the fasteners and interposed between the door section and cutter box. A narrow gap or parting space 362 is defined between confronting edges 364 and 366 of the door 356 and section 356', respectively. The door is pivotally movable in a narrow arc between the closed position 356 shown in solid lines in FIG. 11 and the open position 356" shown in broken lines in said figure. The door is opened to facilitate the threading of the fabric through the cutter box. The door is releasably latched in the closed position by the interengageable latch members 368 and 370 mounted on section 356' and door 356, respectively. The latch member 368 is pivotally mounted in a bifurcated bracket 372 by pivot pin 374, the bracket being suitably secured to section 356', conveniently by a fastener 358. The latch member 368 is of plate-like construction having a latch part 376 at one end and a vertically disposed handle part 378 at the opposite end. The latch member 370 is of plate-like construction with an angularly disposed latch part 380 engaged with companion latch part 376, the latch member being secured to the door by fasteners 382. Thus the latching and unlatching of the door is under the control of handle part 378. Projecting from the cutter box are a pair of guide rods 384, 384' which extend through companion apertures 386 provided in the region of the free end of the door, the rod 384' having a spring 388 thereon disposed between the cutter box and door and which is compressed on the closing of the door. The opening movement of the door is limited by the nut 390 threaded on the outer end of rod 384'. Depending from the door 356 is a length of chain 392 which gauges the height of the cutting box with respect to the superposed layers of cloth on the table.

With reference to FIGS. 17 and 18, a narrow vertically disposed longitudinally extending cloth channel or slot 394 is defined between the confronting walls 396 and 398 of the cutter box and door, respectively, said channel being in vertical alignment with the forward edge of the feed roll 78 (see FIG. 1). A converging entrance to the channel is provided by the inclined wall portions 400 and 402 of the cutter box and door, respectively. The door is provided with a longitudinally extending U-shaped part 404 defining a slot 406 to receive the circular cutting disc 408 of the assembly 264. The cutter box and door are extended of light metallic material to the shape shown in FIG. 17, the cutter box being longitudinally rigidified to resist distortion and the tendency of downward flexing as the cutter assembly 264 travels therealong. The cutter box suspends the cutter assembly for travel therealong and it has been found that this arrangement obviates the downward flexing problem and problems attendant thereto notwithstanding the light weight construction of the cutter box. The cutter box is generally of inverted U-shaped construction having opposite side walls 396, 400 and 342 and a connecting base wall 340 which defines the top of the cutter box. The opposite side walls having aligned inturned portions 414 and 414', the portion 414 defining a track 415 at one side of the box with the oposite track 417 being defined in the longitudinal rib 416 extending inwardly of wall 396. The rib 416 is disposed substantially midway of wall 396 and is grooved to define track 417, the rib serving also to longitudinally rigidify the cutter box against downward flexing forces. Thus the cutter box is of rigidified open box section construction and suspends the cutter assembly 264 for travel therealong in the manner to be described hereinafter.

The cutter assembly comprises a cutter block 418 mounting rollers 420, 422 and 424 on companion stub shafts 426, the roller 420 riding on track 415 and the rollers 422 being disposed in horizontal alignment for riding engagement on track 417. The block 418 is provided with a pair of upstanding pins 428 having springs 430 engaged thereon, there being provided a roller assembly 432 engaged on said pins. The roller assembly 432 comprises a vertical plate 434 having horizontally disposed apertured mounting flanges 436 which are engaged on pins 428 to compress the springs 430. Mounted on shaft 438 at the center of plate 434 are a pair of rollers 440, 440' which are disposed on opposite sides of said plate. The rollers 440, 440' are thus biased into engagement with the wall 340 by springs 430, the roller assembly 432 thereby biasing the rollers 420, 422 and 424 onto their companion tracks of the cutter box.

Mounted in bearings 442 and 442' is the cutting disc shaft 444 which in turn fixedly mounts gear 446 and mounting plate 448, the latter depending below the cutter box. The mounting plate 448 is circular and mounts a rotary cutting disc 408 by means of screws 450, the cutting disc extending across cloth channel 394 into slot 406 of the door. The rotary disc 408 is peripherally sharpened as indicated at 452. The cutter block 418 is formed in two parts 418' and 418" which separate at parting line 454, said block plates being retained in assembled relation by screws 456. As best shown in FIGS. 16 and 17, the block parts 418' and 418" are dished out as indicated at 458 and 458', respectively, to receive the mechanism now to be described. Secured to block part 418" is a series of three upstanding pins 460, 462 and 464, the pins 460 and 464 having rotatably mounted thereon similar sprockets 466 and 466', respectively. The pin 462 rotatably mounts unitary assembly 468 consisting of a sprocket 470 similar to sprocket 466, 466' and a gear 472 in mesh with gear 446, the latter being of substantially smaller diameter than gear 472. The similar sprockets 466, 470, and 466' are disposed at a common level in aligned space relation.

The cutter assembly is reciprocated in the cutter box by chain 474 which has its opposite ends anchored to block part 418' at anchor points 476 and 478, said ends having threaded fittings 480 threadedly engaged to said block part at said anchor points. The lower run 474' of the chain is trained under sprocket 466', over sprocket 470, and under sprocket 466, the chain also being trained around the sprockets 482 and 484 at the opposite ends of the cutter box. The sprocket 482 is motor driven as will be described in detail hereinafter and on the rotation of said sprocket the cutter assembly will be reciprocated with the chain, being in effect a link therein. On cutter assembly movement, the chain will rotate sprockets 466, 470 and 466' to thereby drive the cutting disc through gears 472 and 446, the latter gears providing a speed multiplication to thereby provide high speed cutting disc rotation on cutter assembly reciprocation. Thus the chain reciprocating the cutter assembly in the cutter box drives the cutting disc through speed multiplication gears 472 and 446. The gear 446 and disc 408 rotate in the same direction of rotation as sprockets 466 and 466', the assembly 468 rotating in an opposite direction.

With reference to FIGS. 14 and 23, the sprocket 482 is keyed to the lower end of shaft 486 as indicated at 488, the upper end of said shaft having a worm wheel 490 keyed thereto as indicated at 492. The worm wheel 490 is in mesh with worm 494 which is driven by motor 496 through coupling 498. The worm and worm wheel are enclosed in gear box 500 secured to the wall 340 of the cutter box by fasteners 502. The plate 352 is provided with an extension bracket 352' which serves as a mount for mortor 496 which is suitably secured thereto. It will be apparent that the motor and its transmission drive to the chain 474 are all carried by the cutter box and move therewith as a unitary assembly.

The sprocket 484 as carried in a forked fitting 504 carried by shaft 506 which extends through a companion aperture 508 provided in end plate 350, the shaft being threaded and having a nut 510 engaged thereon. The tension of the chain 474 may be adjusted by means of nut 510. The sprocket 484 is rotatably mounted on pin 512 carried by fitting 504, said pin depending into longitudinal guide slot 514 of the plate 516 which projects laterally from end plate 350. Thus the sprocket 484 is positively guided by the coaction between pin 512 and companion slot 514. Bumpers 518 and 520 formed of a siutable resilient material such as rubber, or the like, are suitably secured in position adjacent end plates 350 and 352, respectively, for coaction with bumper parts 522 and 524, respectively, of the cutter block 418 at the opposite ends of the path of movement thereof. The end plates 350 and 352 are secured in position at the ends of the cutter box by screws 526 which are received in companion fittings 528 projecting from the end plates.

Selective means are provided for buffering or dressing the cutting edge of the cloth cutting disc during the operation thereof. With reference to FIGS. 15, 16, 18 to 20, and 22, a buffering block 530 is rotatably mounted on stub shaft 532 secured to the cutter block at 534. Depending from the cutter block is an integrally formed stop part 536 which is disposed for coaction with the adjustable screw 538 threadedly engaged in the portion 540 of block 530. The block 530 is biased into engagement with stop part 536 by spring 542 one end of which is fixed to portion 540 at 544 with the opposite end being fixed to stop part 536 at 546. The adjustment of screw stop 538 adjusts the position of the buffering assembly 548 with respect to the cutting disc 408. Thus the buffering assembly may be adjusted towards or away from the cutting disc to obtain the requisite amount of overlap of the buffering assembly with respect to the peripheral edge of the cutting disc.

The buffering assembly 548 comprises a U-shaped bracket 550 having a shaft 552 extending between the arms 554 thereof, there being a spaced pair of buffering wheels 556 rotatably mounted on said shaft. The right part 558 of bracket 550 has a laterally projecting shaft 560 which is rotatably mounted in the part 562 of block 530. Thus the buffering assembly is rotatable about the axis disposed at right angles to the pivotal axis of block 530. The buffering assembly is biased in a counterclockwise direction about shaft 560 viewing FIG. 18 by means of spring 564 one end of which is fixed to the bracket 550 at 566 with the opposite end secured to the post 568 of block 530. The space between the wheels 556 defines a slot 570 for the extension therein of the sharpened peripheral edge of the cutting disc. In the normal non-buffering position of the buffering assembly the buffering wheels 556 are disposed parallel to the cutting disc and out of contact therewith as shown in FIGS. 18, 19, and 22. The buffering assembly is selectively pivotally movable to angularly displace the same and bring the wheels 556 into buffering contact with the cutting disc as shown in FIG. 20. Secured to shaft 560 by means of screw 572 is a latch lever 574 having a cam surface 576 terminating in a hook-shaped portion 578. Companion to latch lever 574 is a lever 580 pivotally mounted to the block 530 at 582. The lower end of lever 580 is provided with a pin 584 to facilitate the manual movement of said lever. In the normal non-buffering position, the pin 586 of lever 580 is engaged or latched with the portion 578 of lever 574 as shown in solid lines in FIG. 18, the lever 580 being pivotally movable in a clockwise direction, viewing said figure, to the broken line position 580' against stop pin 588 to release lever 574 and the buffering assembly for movement to the angularly disposed buffering position. In the buffering position the pin 586 of lever 580 will act as a stop to limit the counterclockwise rotation of lever 574. Thus the buffering assembly is movable between buffering and non-buffering positions under the control of lever 580, it being understood that pin 586 rides up cam surface 576 to engage with portion 578 and latch the lever 574 in the normal non-buffering position. To effect sharpening or buffering of the cutting disc during the operation thereof it is merely necessary to move the pin 584 and move the lever 580 to the stop 588, the buffering operation simultaneously buffering both opposite surface portions 590 and 590' of the peripheral sharpened edge portion 452.

Secured to block 418 by screws 592 is a switch plate 594 (FIGS. 14 and 17) which actuates micro-switches 596 and 598 suitably secured in corner portions at the opposite ends of the cutter box. Each switch is provided with a depending actuator 600 disposed in the path of movement of switch plate 594. It will be noted that the latter is spaced from the block 418 so as to clear roller 420 disposed therebelow. In FIG. 26 there is shown the wiring diagram of the cutter assembly motor 496 and control circuit therefor. The operation is such to provide a cutting stroke in either direction of cutter assembly travel. In the home or non-cutting position of the cutter assembly 264, diagrammatically illustrated in FIG. 26, the switch 596 is open and switch 598 is closed and said assembly is disposed at the inner end of the cutter box in which position plate 594 maintains switch 596 open. The control circuit includes power supply 602, main switch 604, and reversing switch 606, all circuits interconnected as shown on the diagram of FIG. 26. The switch 606 is of conventional construction and is externally operated by a two-position toggle control, the two positions being "forward" and "reverse" with a built-in neutral provision that prevents manual operation of the switch from one position to the other without first traversing the neutral provision, the latter providing the requisite time-delay in reversing the direction of rotation of the motor. A single stroke of travel of the assembly 264 along the length of the cutter box provides for the cutting of the fabric exposed to the action of the cutting disc 408 and said stroke may be in either direction of travel of the assembly 264. In the assembly position shown in FIG. 26, a cutting stroke is effected by actuating switch 606 to "reverse" position with the circuit being completed through switch 598 which is closed. At the end of this cutting stroke switch 598 will be automatically opened by the coaction between switch plate 594 and the actuator 600 of switch 598 to break the circuit to the motor and stop the assembly thereat with switch 598 open. The next cutting stroke is effected by actuating the switch 606 to the "forward" position in which case the circuit is completed through switch 596 which is now closed, the assembly being returned to the FIG. 26 position and automatically stopped thereat. The switches 596 and 598 are thus of the normally closed type, being opened by an associated end of the switch plate 594. As aforenoted, the operator cannot actuate the switch 606 to reverse the direction of travel of the assembly without traversing the neutral position which provides a time-delay safety factor.

In operation with frame 50 in the open fabric threading position as shown in FIGS. 1 and 3, the fabric is draped over the roll 58 and is brought into proper side edge adjustment with guide 80 by manipulation of wheels 256 which adjust the carrier 24 lengthwise along its guides and the roll 16 supported thereby. Thereafter the fabric is removed from roll 58 and is draped over the feed or drive roll 78 and the frame 50 is moved to the operating position and latched thereat as shown in FIG. 4 to achieve the desired fabric wrap-around with respect to the feed roll 78. During the threading operation the roll 78 is disengaged from its drive shaft 182 by means of knob 222 which is in the "out" position for such disengagement. The fabric is led from the feed roll through the cutter box as aforedescribed. The tension of the fabric being laid on the table may be adjusted by control 174 which adjusts the speed of shaft 159. The side edge 68 of the fabric during the laying thereof may be adjusted by wheels 256. At the end of a lay the fabric may be cut by manipulating switch 606 to effect a cutting stroke of the cutter assembly 264. The cutter box may be elevated, as desired or required, by manipulating control wheel 302. It will be understood that during operation, the knob 222 will be in the "in" or engaged position so that the feed roll will be positively driven on movement of the machine along the table.

With the frame 50 in the open threading position, the feed roll is constructed for easy draping of the fabric thereover, and by the expediency of swinging said frame to the latched closed or operating position, the roll 58 is automatically disposed to achieve the desired fabric wrap-around with respect to the feed roll.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. In a spreading machine, a carriage for movement over a table, the carriage comprising a pair of end frames, a plurality of members extending between the frames and retaining the frames rigidly in spaced apart association, a platform having a plurality of rollers, the platform being positioned between a pair of the members with certain of the rollers riding upon said pair of members, a dolly, means for pivoting the dolly on the platform, cloth-carrying means mounted on the dolly, certain of the rollers supporting the dolly as it is rotated on said pivoting means, latch means carried by the dolly, and means carried by the carriage astride the pair of members for receiving said latch means.

2. In a spreading machine, a carriage, wheels for supporting the carriage with relation to and for movement over a table, the carriage comprising a pair of end frames, means to provide a plurality of levels of operation for the carriage with relation to the table, a plurality of members extending between the frames and retaining the frames rigidly in spaced apart association, a platform having a plurality of rollers, the platform being positioned between a pair of the members with certain of the rollers riding upon said pair of members, a dolly, means for pivoting the dolly on the platform, cloth-carrying means mounted on the dolly, certain of the rollers supporting the dolly as it is rotated on said pivoting means, latch means carried by the dolly, and means carried by the carriage astride the pair of members for receiving the latch means at every position of the platform along the pair of members.

3. In a spreading machine comprising a carriage movable over a table, means mounted on the carriage for supporting a supply of sheet material, a single driven roll mounted on the carriage, means on the carriage for guiding the sheet material to the driven roll, the guiding means comprising a roller movable to engage the sheet material to force it into wrap-around engagement with the driven roll, the sheet material hanging substantially in a vertical plane on moving free from the driven roll, the guiding means providing means to move the roller to free the sheet material from the wrap-around engagement so that the sheet material may be threaded past the roll, the roller being then movable to straddle the roll and cause the sheet material again to assume the wrap-around relationship, a sheet material cutting member directly beneath the roll to receive sheet material fed by the roll, a guide for the sheet material at the cutting member comprising a fixed wall on the carriage, the fixed wall being substantially in said vertical plane, and a movable wall shaped to cooperate with the fixed wall to lead the sheet material smoothly past the position of the cutting member, and means for supporting the movable wall for swinging completely away from the fixed wall to permit positioning the sheet material against the face of the fixed wall without interference from the movable wall.

4. In a spreading machine comprising a carriage movable over a table, means mounted on the carriage for supporting a roll of sheet material, the supporting means comprising a turntable, means supporting the turntable for rectilinear movement and movement around a substantially vertical axis to a plurality of end delivery positions, a single driven roll mounted on the carriage and positioned to receive the sheet material moving from the sheet material roll at any one of the end delivery positions, means on the carriage for guiding the sheet material from the sheet material roll to the driven roll, the guiding means comprising a roller movable to engage the sheet material to force it into wrap-around engagement with the driven roll, the sheet material hanging substantially in a vertical plane on moving free from the driven roll, the guiding means providing means to move the roller to free the sheet material from the wrap-around engagement so that the sheet material may be threaded past the driven roll, the roller being then movable to straddle the driven roll and cause the sheet material again to assume the wrap-around relationship, a sheet material cutting member directly beneath the driven roll to receive sheet material fed by the driven roll, a guide for the sheet material at the cutting member comprising a fixed wall on the carriage, the fixed wall being substantially in said vertical plane, and a movable wall shaped to cooperate with the fixed wall to lead the sheet material smoothly past the position of the cutting member, and means for supporting the movable wall for swinging completely away from the fixed wall to permit positioning the sheet material against the face of the fixed wall without interference from the movable wall.

5. In a spreading machine comprising a carriage movable over a table, means mounted on the carriage for supporting a roll of sheet material, the supporting means comprising a turntable, means supporting the turntable for rectilinear movement and movement around a substantially vertical axis to a plurality of end delivery positions, a single driven roll mounted on the carriage and positioned to receive the sheet material moving from the sheet material roll at any one of the end delivery positions, means on the carriage for guiding the sheet material from the sheet material roll to the driven roll, the guiding means comprising a roller, a pivotal support for the roller movable to dispose the roller, engaging and forcing the sheet material into wrap-around engagement with the driven roll or to move the roller to free the sheet material from the wrap-around engagement, the sheet material hanging substantially in a vertical plane from the driven roll when the roller is in engaging position but being freely positionable when freed from the wrap-around engagement so that the sheet material may be threaded past the driven roll, the roller in the engaging position straddling the driven roll to cause the sheet material to assume the wrap-around relationship, a sheet material cutting member directly beneath the driven roll to receive sheet material fed by the driven roll, a guide for the sheet material at the cutting member comprising a fixed wall on the carriage, the fixed wall being substantially in said vertical plane, and a movable wall shaped to cooperate with the fixed wall to lead the sheet material smoothly past the position of the cutting member, and means for supporting the movable wall for swinging completely away from the fixed well to permit positioning the sheet material against the face of the fixed wall without interference from the movable wall.

6. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage, and a frame mounted to swing to and away from the feed roll, a fabric roll carried by the frame and movable thereby with relation to the feed roll, the frame in one position disposing the fabric roll remote from and opening up a substantial gap between it and the feed roll for threading fabric over and past the feed roll through the gap, the frame in another position positioning the fabric roll resting upon the feed roll and the fabric resting upon the feed roll in feeding position, the fabric in this last position passing from the cloth-carrying means under the fabric roll and over and around and in engagement with and then depending from the feed roll to drape the fabric in substantial surface engagement with the surface of the feed roll.

7. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage on an axis to one side of the feed roll, and a frame mounted to swing to and away from the feed roll, a fabric roll carried by the frame and movable thereby with relation to the feed roll, the frame in one position disposing the fabric roll remote from and on the other side of the feed roll from the cloth-carrying means, the fabric roll in that position opening up a substantially gap between it and the feed roll for threading fabric over and past the feed roll through the gap, the frame in another position positioning the fabric roll resting upon the feed roll and the fabric resting upon the feed roll in feeding position, the fabric in this last position passing from the cloth-carrying means under the fabric roll and over and around and in engagement with and then depending from the feed roll to drape the fabric in substantial surface engagement with the surface of the feed roll.

8. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage on an axis to one side of the feed roll, and a frame mounted to swing to and away from the feed roll, a fabric roll carried by the frame and movable thereby with relation to the feed roll, the frame in one position disposing the fabric roll remote from and on the other side of the feed roll from the cloth-carrying means, the fabric roll in that position opening up a substantial gap between it and the feed roll for threading fabric over and past the feed roll through the gap, the frame in another position positioning the fabric roll resting upon the feed roll on the side of the feed roll toward the cloth-carrying means and with at least a part of the fabric roll below the topmost portion of the feed roll to deflect the fabric between the feed roll and the cloth-carrying means into a loop extending downwardly and against the feed roll in feeding position, the fabric in this last position passing from the cloth-carrying means under the fabric roll and over and around and in engagement with and then depending from the feed roll to drape the fabric in substantial surface engagement with the surface of the feed roll.

9. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage, and a frame mounted to swing to and away from the feed roll, a fabric roll carried by the frame and movable thereby with relation to the feed roll, the frame in one position disposing the fabric roll remote from and opening up a substantial gap between it and the feed roll for threading fabric over and past the feed roll through the gap, the frame in another position positioning the fabric roll resting upon the feed roll and the fabric resting upon the feed roll in feeding position, the fabric in this last position passing from the cloth-carrying means under the fabric roll and over and around and in engagement with and then depending from the feed roll to drape the fabric in substantial surface engagement with the surface of the feed roll, the frame having end supports at least one of which has means for engaging the carriage to retain the fabric roll in fabric-draping relation to the feed roll.

10. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage, a frame mounted to swing to and away from the feed roll, a fabric roll carried by the frame and movable thereby with relation to the feed roll, the frame in one position disposing the fabric roll remote from and opening up a substantial gap between it and the feed roll for threading fabric over and past the feed roll through the gap, the frame in another position positioning the fabric roll resting upon the feed roll and the fabric resting upon the feed roll in feeding position, the fabric in this last position passing from the cloth-carrying means under the fabric roll and over and around and in engagement with and then depending from the feed roll to drape the fabric in substantial surface engagement with the surface of the feed roll, and means for releasably latching the frame to retain the fabric roll in fabric-draping relation to the feed roll.

11. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage on an axis to one side of the feed roll, and a frame mounted to swing to and away from the feed roll, a fabric roll carried by the frame and movable thereby with relation to the feed roll, the frame in one position disposing the fabric roll remote from and on the other side of the feed roll from the cloth-carrying means, the fabric roll in that position opening up a substantial gap between it and the feed roll for threading fabric over and past the feed roll through the gap, the frame in another position positioning the fabric roll resting upon the feed roll on the side of the feed roll toward the cloth-carrying means and with at least a part of the fabric roll below the topmost portion of the feed roll to deflect the fabric between the feed roll and the cloth-carrying means into a loop extending downwardly and against the feed roll in feeding position, the fabric in this last position passing from the cloth-carrying means under the fabric roll and over and around and in engagement with and then depending from the feed roll to drape the fabric in substantial surface engagement with the surface of the feed roll, the frame having end supports at least one of which has means for engaging the carriage to retain the fabric roll in fabric-draping relation to the feed roll.

12. In a spreading machine, a carriage, the carriage being mounted for rolling movement over a table, a feed roll mounted on the carriage on an axis substantially fixed with relation to the carriage, means for rotating the feed roll by movement of the carriage over the table, cloth-carrying means carried by the carriage on the axis to one side of the feed roll, a frame mounted to swing to and away from the feed roll, a fabric roll carried by the frame and movable thereby with relation to the feed roll, the frame in one position disposing the fabric roll remote from and on the other side of the feed roll from the cloth-carrying means, the fabric roll in that position opening up a substantial gap between it and the feed roll for threading fabric over and past the feed roll through the gap, the frame in another position positioning the fabric roll resting upon the feed roll on the side of the feed roll toward the cloth-carrying means and with at least a part of the fabric roll below the topmost portion of the feed roll to deflect the fabric between the feed roll and the cloth-carrying means into a loop extending downwardly and against the feed roll in feeding position, the fabric in this last position passing from the cloth-carrying means under the fabric roll and over and around and in engagement with and then depending from the feed roll to drape the fabric in substantial surface engagement with the surface of the feed roll, and means for releasably latching the frame to retain the fabric roll in fabric-draping relation to the feed roll.

13. In a spreading machine, a carriage, the carriage being mounted for rolling movement over a table, a feed roll mounted on the carriage on an axis substantially fixed with relation to the carriage, a carrier mounted and movable on the carriage for movement transversely of the carriage rolling movement on the table, means for rotating the feed roll by movement of the carriage over the table, cloth-carrying means mounted on the carrier and adjustable therewith lengthwise of the feed roll on an axis to one side of the feed roll, and a frame mounted on the carriage to swing to and away from the feed roll, a fabric roll carried by the frame and movable thereby with relation to the feed roll, the frame in one position disposing the fabric roll remote from and on the other side of the feed roll from the carrier, the fabric roll in that position opening up a substantial gap between it and the feed roll for threading fabric over and past the feed roll through the gap, the frame in another position positioning the fabric roll resting upon the feed roll on the side of the feed roll toward the carrier and with at least a part of the fabric roll below the topmost portion of the feed roll to deflect the fabric between the feed roll and the carrier into a loop extending downwardly and against the feed roll in feeding position, the fabric in this last position passing from the cloth-carrying means under the fabric roll and over and around and in engagement with and then depending from the feed roll to drape the fabric in substantial surface engagement with the surface of the feed roll.

14. In a spreading machine, a carriage, the carriage being mounted for rolling movement over a table, a feed roll mounted on the carriage on an axis substantially fixed with relation to the carriage, a carrier mounted and movable on the carriage for movement transversely of the carriage rolling movement on the table, a support rotatable on a vertical axis positioned on and movable with the carrier, means for rotating the feed roll by movement of the carriage over the table, cloth-carrying means mounted on the rotatable support and adjustable therewith lengthwise of the feed roll on an axis to one side of the feed roll, and a frame mounted on the carriage to swing to and away from the feed roll, a fabric roll carried by the frame and movable thereby with relation to the feed roll, the frame in one position disposing the fabric roll remote from and on the other side of the feed roll from the carrier, the fabric roll in that position opening up a substantial gap between it and the feed roll for threading fabric over and past the feed roll through the gap, the frame in another position positioning the fabric roll resting upon the feed roll toward the carrier and with at least a part of the fabric roll below the topmost portion of the feed roll to deflect the fabric between the feed roll and the carrier into a loop extending downwardly and against the feed roll in feeding position, the fabric in this last position passing from the cloth-carrying means under the fabric roll and over and around and in engagement with and then depending from the feed roll to drape the fabric in substantial surface engagement with the surface of the feed roll.

References Cited in the file of this patent

UNITED STATES PATENTS

| | | |
|---|---|---|
| 1,999,276 | Block | Apr. 30, 1935 |
| 2,478,840 | Sayles | Aug. 9, 1949 |
| 2,506,004 | Ward et al. | May 2, 1950 |
| 2,670,040 | Sayles | Feb. 23, 1954 |
| 2,727,571 | Sayles | Dec. 20, 1955 |